United States Patent
Yonezawa et al.

(10) Patent No.: US 11,597,442 B2
(45) Date of Patent: Mar. 7, 2023

(54) VEHICLE FRAME STRUCTURE

(71) Applicant: Toyota Jidosha Kabushiki Kaisha, Toyota (JP)

(72) Inventors: Seiho Yonezawa, Toyota (JP); Hiroshi Chino, Nissin (JP); Taisuke Satoi, Kazaki (JP); Tomoya Takahashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 17/167,616

(22) Filed: Feb. 4, 2021

(65) Prior Publication Data

US 2021/0253173 A1 Aug. 19, 2021

(30) Foreign Application Priority Data

Feb. 17, 2020 (JP) .............................. JP2020-024723

(51) Int. Cl.
| | | |
|---|---|---|
| *B62D 21/15* | (2006.01) | |
| *B62D 21/03* | (2006.01) | |
| *B62D 21/07* | (2006.01) | |
| *B62D 29/04* | (2006.01) | |

(52) U.S. Cl.
CPC .......... *B62D 21/152* (2013.01); *B62D 21/03* (2013.01); *B62D 21/07* (2013.01); *B62D 29/041* (2013.01); *B62D 21/157* (2013.01)

(58) Field of Classification Search
CPC ...... B62D 21/152; B62D 21/03; B62D 21/07; B62D 29/041; B62D 21/157; B62D 25/00; B62D 29/046
See application file for complete search history.

(56) References Cited

U.S. PATENT DOCUMENTS

| | | | | |
|---|---|---|---|---|
| 1,653,419 | A | * 12/1927 | Staley | .................... B62D 21/00 |
| | | | | 280/87.01 |
| D149,830 | S | * 6/1948 | Nelson | .......................... 280/798 |
| 4,907,735 | A | 3/1990 | Ushioda et al. | |
| 2020/0406974 | A1* | 12/2020 | Ikeda | ....................... B60K 1/04 |
| 2022/0009761 | A1* | 1/2022 | Archer | ....................... E06C 5/04 |

FOREIGN PATENT DOCUMENTS

| | | |
|---|---|---|
| JP | S64-44232 A | 2/1989 |
| JP | H01111575 A | 4/1989 |
| JP | H08-104253 A | 4/1996 |
| JP | 2016-068914 A | 5/2016 |

* cited by examiner

*Primary Examiner* — Lori L Lyjak
(74) *Attorney, Agent, or Firm* — Dinsmore & Shohl LLP

(57) ABSTRACT

A vehicle frame structure includes a pair of side members located on both right and left sides of a vehicle, each of the pair of side members extending both forward and rearward of a cabin along a respective side of the cabin. As each of the pair of side members extends in a longitudinal direction at a substantially uniform height, a load applied to one end can be transferred toward the other end.

5 Claims, 5 Drawing Sheets

Cross section taken along line II-II

Cross section taken along line III-III

Cross section taken along line IV-IV

VEHICLE FRAME STRUCTURE

CROSS REFERENCE TO RELATED APPLICATION

This application claims priority to Japanese Patent Application No. 2020-024723 filed on Feb. 17, 2020, which is incorporated herein by reference in its entirety including the specification, claims, drawings, and abstract.

TECHNICAL FIELD

The present disclosure relates to a vehicle frame structure, and more particularly to the frame in the longitudinal direction of the vehicle.

BACKGROUND

Conventional vehicle frame structures include unibody frames (also called monocoque frames) formed by bending a plate in a box-like shape. Such unibody frames are often formed of fiber reinforced plastic (FRP), in particular, carbon fiber reinforced plastic (CFRP).

JP H01-111575 A discloses that an under member constituting a floor portion of a vehicle is formed of synthetic resin (plastic) and that a vehicle-body panel is attached to the under member as a roof for a vehicle body via an arch-like pillar with high rigidity. In this structure, the pillar, for example, can reinforce an under member of insufficient strength.

In the disclosure of JP H01-111575 A, frame members are offset in their positions in the height direction between a front body side located in front of a cabin and a cabin side. Accordingly, in the event of a front or rear vehicle collision such frame members may not sufficiently transfer the load in the longitudinal direction of the vehicle.

SUMMARY

The present disclosure provides a vehicle frame structure that can effectively transfer a load in the longitudinal direction of a vehicle.

According to one aspect of the present disclosure, there is provided a vehicle frame structure comprising a pair of side members located on both right and left sides of a vehicle, each of the pair of side members extending both forward and rearward of the cabin along a respective side of the cabin, each of the pair of side members extending in the longitudinal direction at a substantially uniform height such that a load applied to one end can be transferred toward the other end.

The height of the side members may be higher than the seating surface of a seat in the vehicle.

The vehicle frame structure may further comprise a pair of lower side members located below the pair of side members and extending in the longitudinal direction of the vehicle, each of the pair of lower side members may extend in the longitudinal direction at a substantially uniform height such that a load applied to one end can be transferred toward the other end.

The vehicle frame structure may comprise a unibody frame having a rectangular frame-like shape extending in the longitudinal direction of the vehicle, the unibody frame having four corners on which the pair of side members and the pair of lower side members may be provided. The unibody frame may be formed by bending a plate in a box-like shape.

The unibody frame, the pair of side members, and the pair of lower side members may be made of carbon fiber reinforced plastic.

The vehicle frame structure may further comprise at least one cross frame member that joins the pair of side members in a vehicle width direction.

According to the present disclosure, as the vehicle frame structure includes the pair of side members extending in the longitudinal direction at substantially uniform height, a load applied to one end can be efficiently transferred toward the other end.

BRIEF DESCRIPTION OF DRAWINGS

Embodiments of the present disclosure will be described based on the following figures, wherein.

DESCRIPTION OF EMBODIMENTS

Embodiments of the present disclosure will now be described with reference to the drawings. The present disclosure is not limited to the embodiments described herein.

Figure 1A:
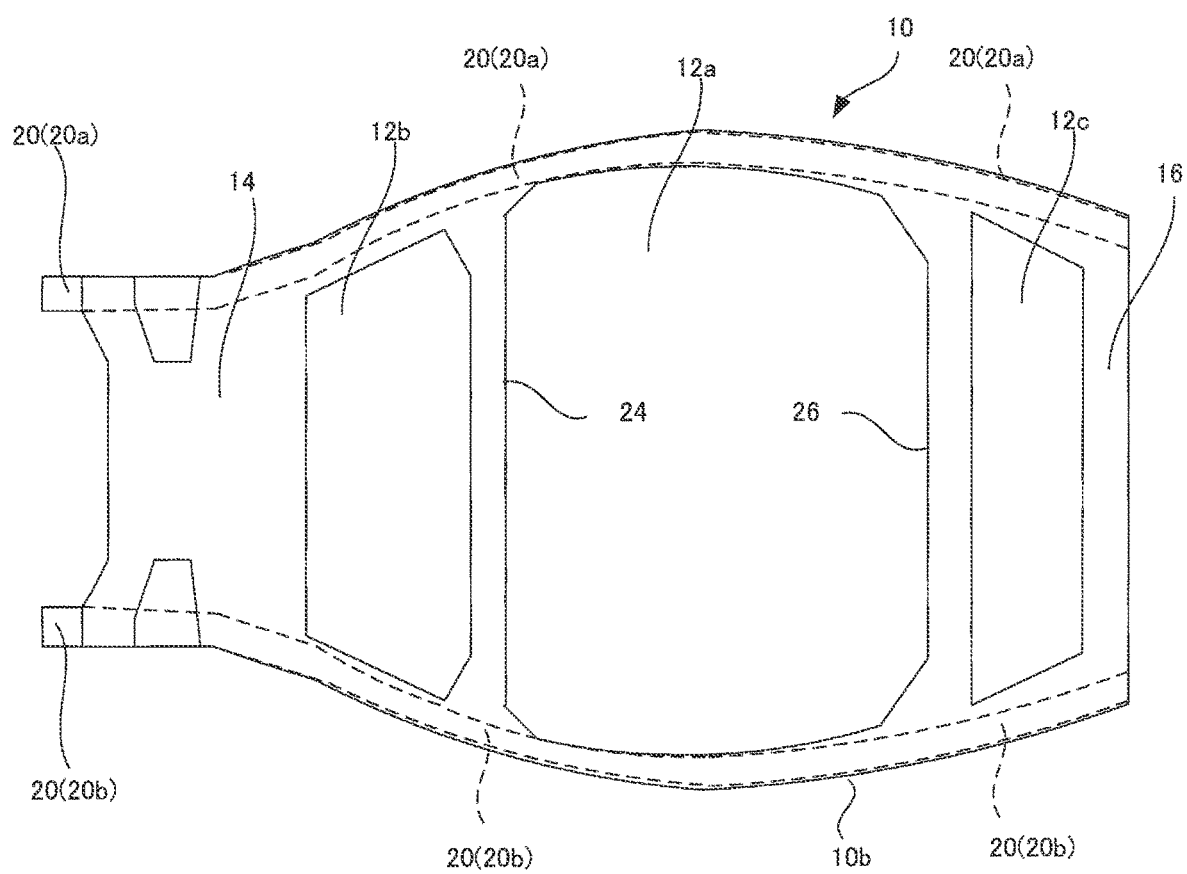
FIG. 1A is a plan view schematically illustrating a unibody frame including a vehicle frame structure according to an embodiment.
Figure 1B:
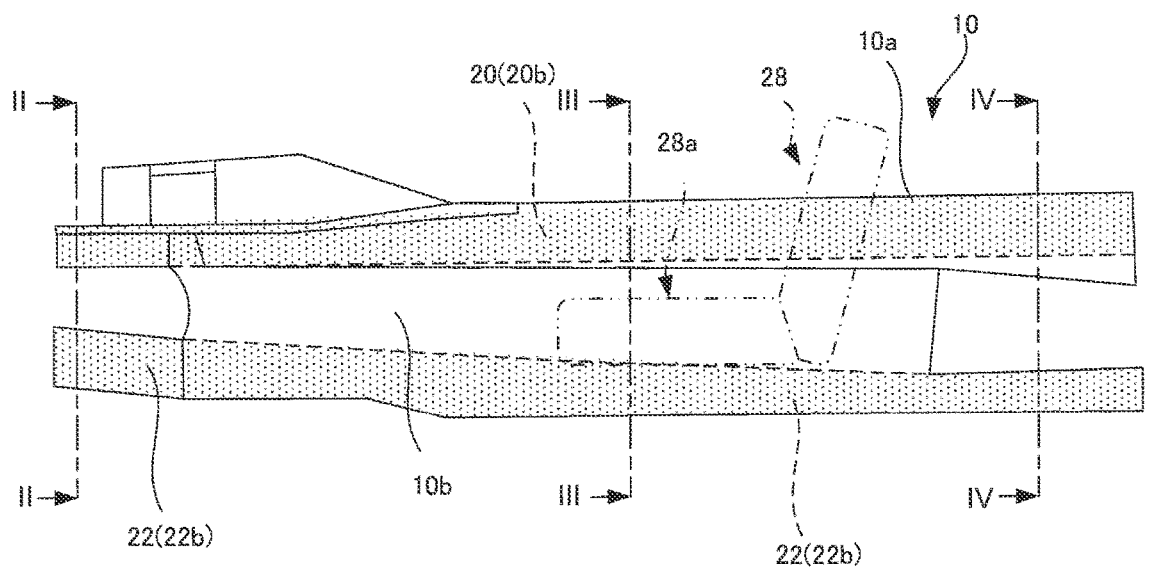
FIG. 1B is a side view schematically illustrating the unibody frame including the vehicle frame structure according to the embodiment.
Figure 2:
FIG. 2 is a cross-sectional view taken along line II-II in FIG. 1B.
Figure 3:
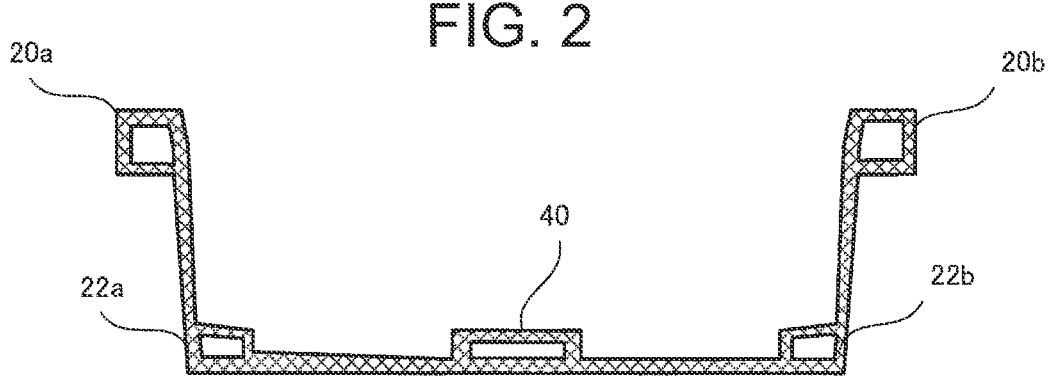
FIG. 3 is a cross-sectional view taken along line in FIG. 1B.
Figure 4:
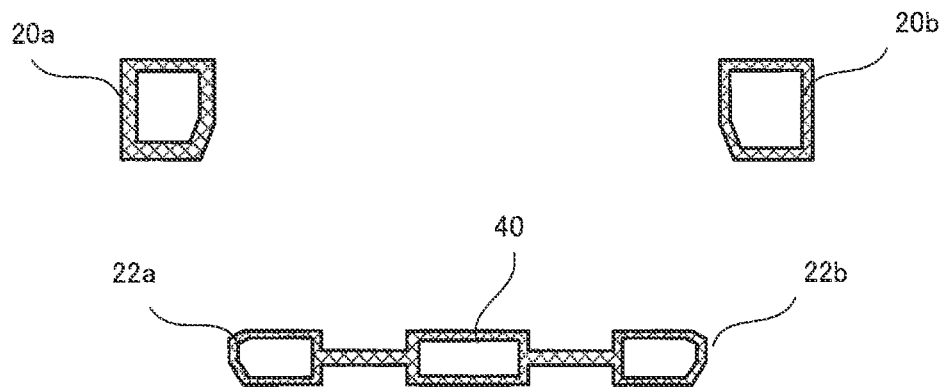
FIG. 4 is a cross-sectional view taken along line IV-IV in FIG. 1B.

FIG. 1A and FIG. 1B schematically illustrate a unibody frame including a vehicle frame structure according to an embodiment of the present disclosure. FIG. 1A is a plan view and FIG. 1B is a side view. FIGS. 2 to 4 illustrate cross-sectional views taken along a plane in the vehicle width direction of the unibody frame 10. FIG. 2 illustrates a cross section taken along line II-II at a front end, FIG. 3 illustrates a cross section taken along line III-III at a middle portion, and FIG. 4 illustrates a cross section taken along line IV-IV at a rear end.

The unibody frame 10 extends from the front of a vehicle to the rear and widens in the vehicle width direction at its middle portion, and has a predetermined height. The unibody frame 10 is formed basically by a plate material and has a hollow rectangular cuboid shape with its front and rear open. The middle portion in the longitudinal direction widens in the vehicle width direction as seen in a plan view. In this example, the unibody frame 10 is made of carbon fiber reinforced plastic (CFRP).

A vehicle incorporating the unibody frame 10 described herein includes canopy doors, and right and left doors are respectively hinged at upper front portions on right and left side portions of the unibody frame 10 to swing and open upwardly rearward. The side portions of the unibody frame 10 are at the shin to knee height of a typical person, and vehicle occupants straddle the side portions to enter the vehicle.

As shown in FIG. 1, a top surface has three openings 12 (12a, 12b, and 12c). The opening 12a located in the middle portion in the longitudinal direction corresponds to an area where cabin seats (a driver's seat and a passenger seat) 28 are placed. A seat 28 has a seating surface 28a located below the top end of a side portion 10b of the unibody frame 10 and a backrest provided to protrude upwardly from the top surface 10a of the unibody frame 10. As described below, the unibody frame 10 includes, at its four corners (four corners as viewed from the longitudinal direction), side members 20 (20a and 20b) and 22 (22a and 22b) extending both forward and rearward of the cabin along a respective side of the cabin. Specifically, a pair of side members 20 (20a and 20b) are provided at the two upper corners, and a pair of side members 22 (22a and 22b) are provided at the two lower corners. The pair of side members 20 (20a and 20b) provided at the two upper corners are located higher than the seating surface of the seat 28.

While the unibody frame 10 is a single, integrally molded frame, the side members 20 and 22 may be separate side members that are joined to the unibody frame 10 by, for example, an adhesive.

The opening 12b, which is located in the front, corresponds to an area in front of the driver's seat where an accelerator pedal, a brake pedal, and other components are placed, and a dash panel is positioned at the front end of the front opening 12b. Specifically, the cabin extends to the front end of the opening 12b or a portion slightly forward of the front end of the opening 12b, and forward of the cabin is a space on a front body side. The opening 12c located rearward of the opening 12a corresponds to an area where an engine and other components are placed.

A front cross frame member 24 provided between the openings 12a and 12b extends in the vehicle width direction and connects side walls, and a rear cross frame member 26 provided between the openings 12a and 12c extends in the vehicle width direction and connects the side walls. A front panel 14 is provided in front of the opening 12b, and a rear beam 16 is provided rearward of the opening 12c.

The unibody frame 10 includes the upper side members 20 (20a and 20b), which are also called as side frames, at its two upper right and left corners. The side members 20 (20a, 20b) are rectangular frame members each extending in the longitudinal direction along a respective side of the vehicle, with their cross sections being rectangular and closed on all sides. Each of the side members 20 (20a, 20b) includes a curved, outwardly expanding portion at its middle in the longitudinal direction as seen in a plan view, similarly as the unibody frame 10. Meanwhile, the side members 20 (20a and 20b) are generally located at a uniform height, as seen in side views.

The unibody frame 10 includes lower side members 22 (22a and 22b), which are also referred to as lower side frames, at its two lower right and left corners of the side members 20. The lower side members 22 are also rectangular frame members each extending in the longitudinal direction along a respective side of the vehicle, with their cross sections being rectangular and closed on all sides, resembling the upper side member 20 in shape. The term "lower side member 22" is used when distinction from the upper side members 20 is required.

As described above, the unibody frame 10 includes, at the four corners, the side members 20 and 22 extending both forward and rearward of the unibody frame 10. The four frame members (the side members 20 and the lower side members 22) extend parallel with one another without intersecting as seen in a side view.

Figure 5:
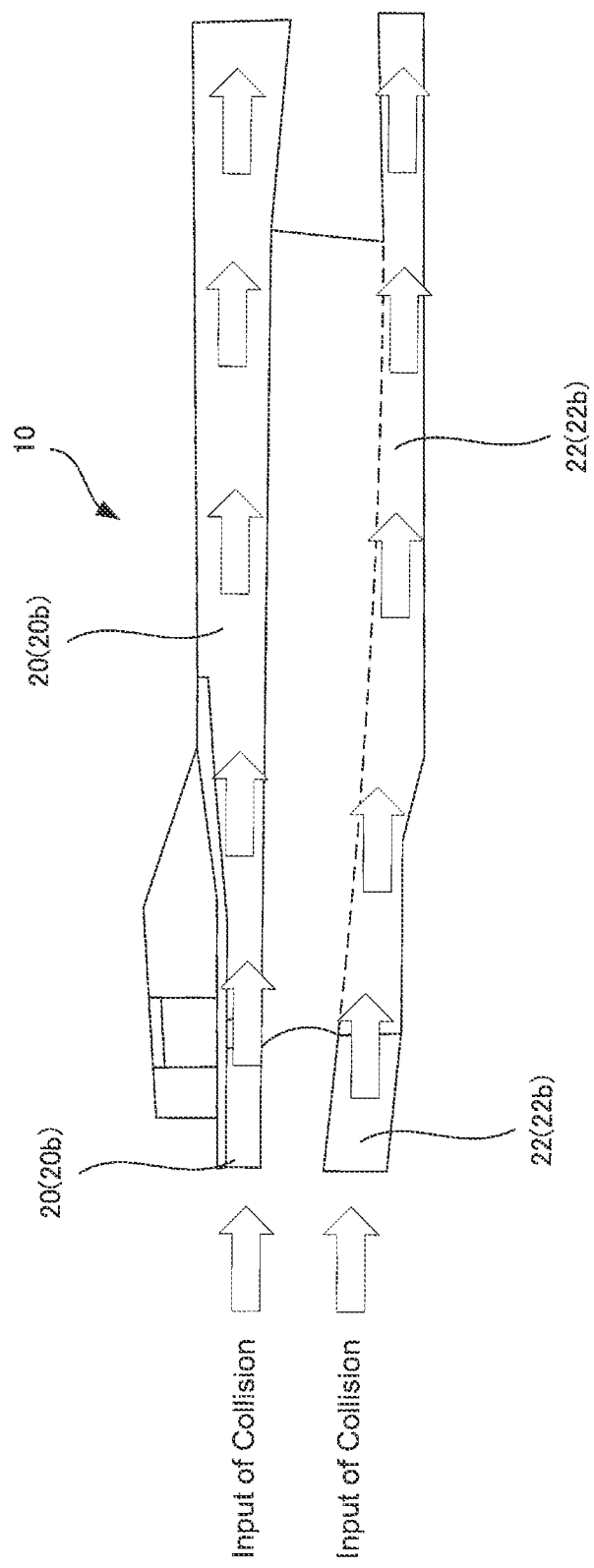
FIG. 5 illustrates the unibody frame in which a load is transferred in the front-to-rear direction.

Accordingly, in the event of a front or rear collision, these four side members 20 and 22 serve as paths for transferring a load in the longitudinal direction of the vehicle. As shown in FIG. 5, a load applied from the front is transferred to the rear. In particular, efficient load transfer is achieved because the side members have no major offset in the height direction and transfer a load substantially linearly as seen from the side. As such, the unibody frame 10 made using synthetic resin material can also have sufficient strength. In particular, components such as crash boxes connected to the side members 20 and 22 allow effective absorption of collision energy.

In a typical vehicle, cabin side members are located at a height lower than that of front body frame members. Because the lower end of a door provided on a side of the cabin is located substantially at a uniform position as a cabin floor, the side members of the cabin are positioned at a similar height as the floor. On the other hand, because the side portions forward of the cabin have wheel-receiving spaces (openings for wheels), the frame members are located at relatively an upper position. In the illustrated embodiment, a canopy door is used. As the lower end of the door is set at a relatively high position, the side members are located substantially at a uniform position in the height direction along the longitudinal direction. In particular, in a front or rear vehicle collision, the side members 20 disposed at a higher position than the seating surface of the seat placed in the cabin can effectively transfer a load.

Further, two cross frame members (a front cross frame member 24 and a rear cross frame member 26) provided in the vehicle width direction prevent widening of the side members 20 and additionally the side members 22 in the vehicle width direction as seen in a plan view in a front collision. The front cross frame member 24 and the rear cross frame member 26 can further serve as load paths in a side collision, and enhance the strength of the unibody frame 10 against a side collision.

Figure 6A:
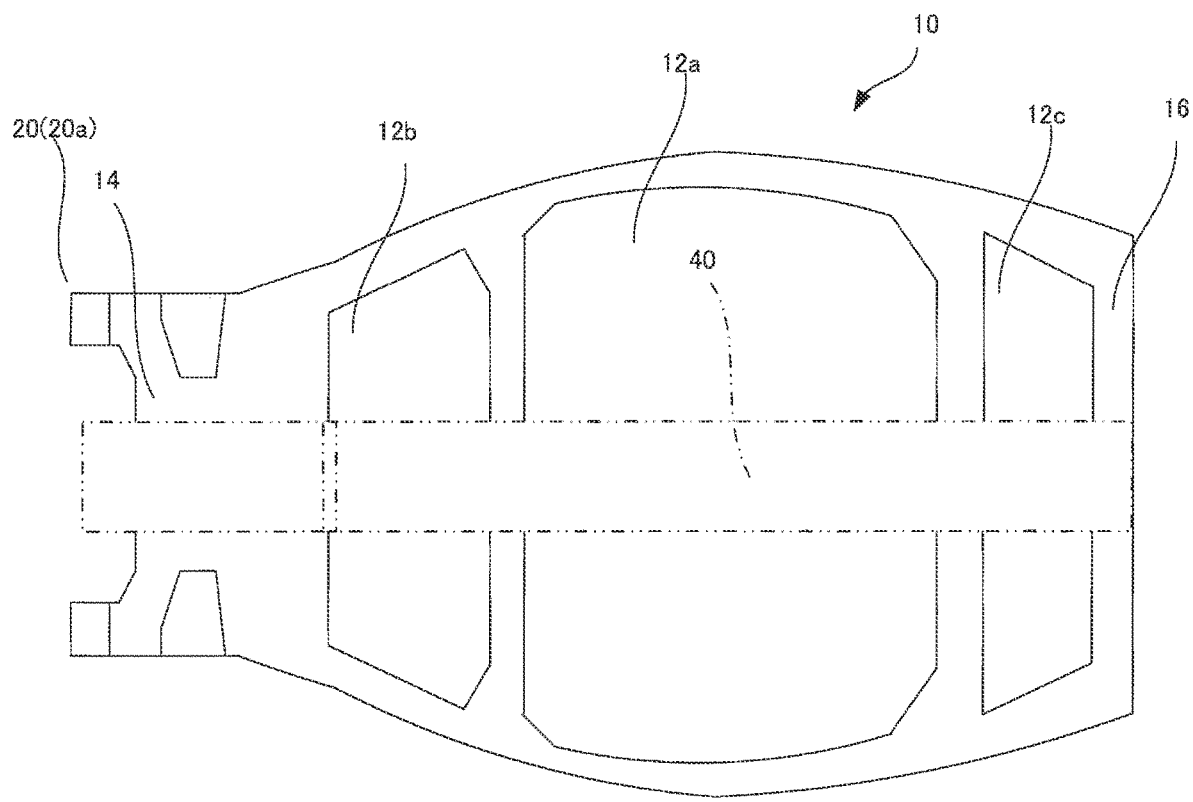
FIG. 6A is a plan view illustrating a center frame member.
Figure 6B:
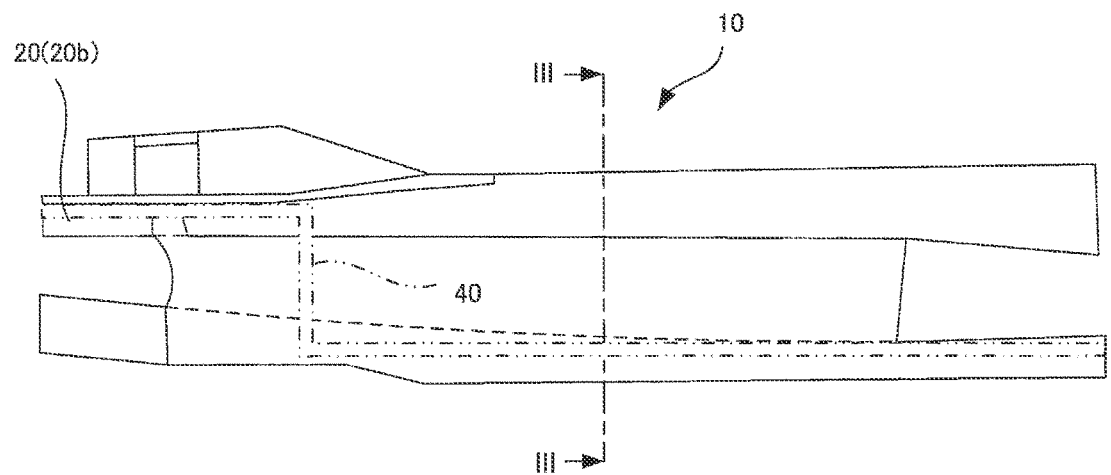
FIG. 6B is a side view illustrating the center frame member.

As illustrated in FIGS. 6A and 6B, a center frame member 40 may be provided as a fifth member. The front end of the center frame member 40 is as high as the side members 20 and positioned at the middle portion in the vehicle width direction. The center frame member 40 extends along a dash panel, down to a height equal to the height of the lower side members 22, and rearward along a base surface of the unibody frame 10. FIG. 3 illustrates the center frame member 40. The center frame member 40 is also a rectangular frame member with the cross section being rectangular and closed on all sides, but has a flat shape with shorter sides in the height direction. Incorporating such a center frame member 40 reinforces the unibody frame 10 and enhances the strength against a front collision.

Figure 7A:
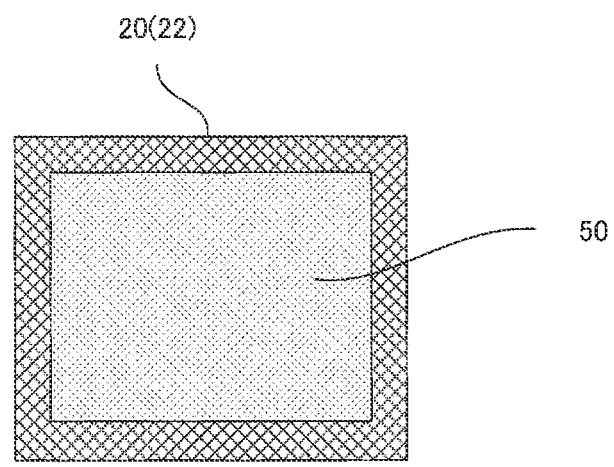
FIG. 7A is a cross section schematically illustrating a side member filled with foamed plastic.
Figure 7B:
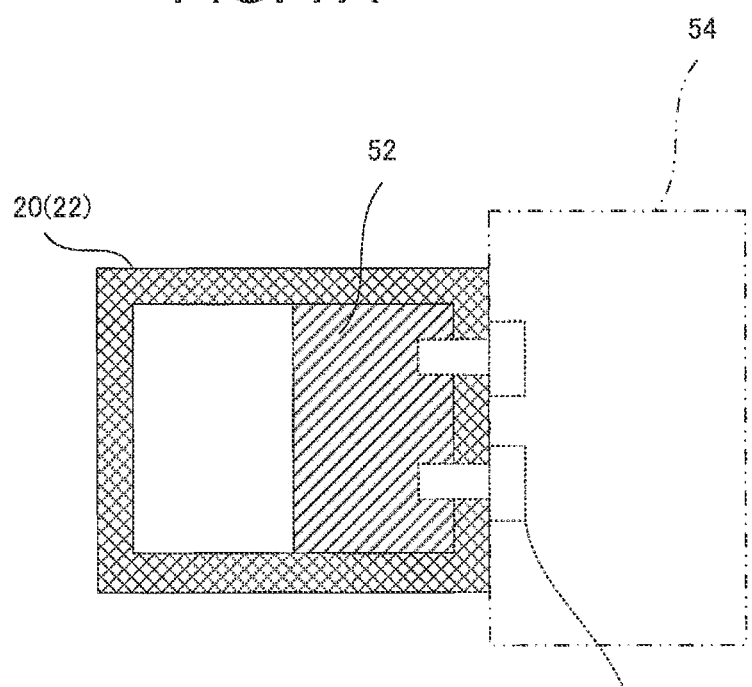
FIG. 7B is a cross section schematically illustrating a side member which receives an aluminum insert.

FIGS. 7A and 7B are cross sections schematically illustrating the side member 20 (lower side member 22). FIG. 7A illustrates a side member filled with foamed plastic, and FIG. 7B illustrates a side member which receives an aluminum insert. As described above, the hollow rectangular frame members (the side members 20 and the lower side members 22) are formed as a part of the unibody frame 10. The inside of the frame members (the side members 20 and the lower side members 22) may simply be a space or may be filled with, for example, a foamed plastic 50. Additionally, the inside of the frame member may partly be filled with an aluminum material 52, to which a component 54 in the cabin may be secured by, for example, bolts 56.

The front of the side members 20 and the side members 22 may be connected to, for example, a bumper reinforcement with, for example, crash boxes, and a portion of a load in a front collision may be first absorbed in the crash boxes before being transferred to the side members 20 and to the lower side members 22.

As described above, the front panel 14 of the unibody frame 10 is located forward of the dash panel. As such, each of the side members 20 and the lower side members 22 may be separated into front and rear portions at the dash panel. In this instance, the front and rear portions of each of the side members 20 and the lower side members 22 may be joined together in the longitudinal direction via the dash panel.

The invention claimed is:

1. A vehicle frame structure comprising:
   a pair of side members located on both right and left sides of a vehicle, each of the pair of side members extending both forward and rearward of the cabin along a respective side of the cabin, each of the pair of side members extending in a longitudinal direction at a substantially uniform height such that a load applied to one end can be transferred toward the other end;
   a pair of lower side members located below the pair of side members and extending in the longitudinal direction of the vehicle, each of the pair of lower side members extending in the longitudinal direction at a substantially uniform height such that a load applied to one end can be transferred toward the other end; and
   a unibody frame having a rectangular frame-like shape extending in the longitudinal direction of the vehicle, the unibody frame having four corners on which the pair of side members and the pair of lower side members are provided.

2. The vehicle frame structure according to claim 1, wherein the height of the side members is higher than the seating surface of a seat in the vehicle.

3. The vehicle frame structure according to claim 1, wherein the unibody frame, the pair of side members, and the pair of lower side members are made of carbon fiber reinforced plastic.

4. The vehicle frame structure according to claim 2, wherein the unibody frame, the pair of side members, and the pair of lower side members are made of carbon fiber reinforced plastic.

5. The vehicle frame structure according to claim 1, further comprising at least one cross frame member that joins the pair of side members in a vehicle width direction.

* * * * *

UNITED STATES PATENT AND TRADEMARK OFFICE
CERTIFICATE OF CORRECTION

PATENT NO. : 11,597,442 B2  
APPLICATION NO. : 17/167616  
DATED : March 7, 2023  
INVENTOR(S) : Seiho Yonezawa et al.

Page 1 of 1

It is certified that error appears in the above-identified patent and that said Letters Patent is hereby corrected as shown below:

On the Title Page

Item (72) after the third inventor listed as Taisuke Satoi, Kazaki (JP) Please take out "Kazaki" and insert --Okazaki--

Signed and Sealed this
Tenth Day of October, 2023

Katherine Kelly Vidal
*Director of the United States Patent and Trademark Office*